US007392190B1

United States Patent
Cosatto et al.

(10) Patent No.: US 7,392,190 B1
(45) Date of Patent: *Jun. 24, 2008

(54) COARTICULATION METHOD FOR AUDIO-VISUAL TEXT-TO-SPEECH SYNTHESIS

(75) Inventors: Eric Cosatto, Highlands, NJ (US); Hans Peter Graf, Lincroft, NJ (US); Juergen Schroeter, New Providence, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,806

(22) Filed: Aug. 24, 2006

Related U.S. Application Data

(63) Continuation of application No. 10/676,630, filed on Oct. 1, 2003, now Pat. No. 7,117,155, which is a continuation of application No. 09/390,704, filed on Sep. 7, 1999, now Pat. No. 6,662,161, which is a continuation of application No. 08/965,702, filed on Nov. 7, 1997, now Pat. No. 6,112,177.

(51) Int. Cl.
*G10L 13/00* (2006.01)
(52) U.S. Cl. .................. 704/260; 704/251; 704/258
(58) Field of Classification Search ............. 704/260, 704/251, 258; 345/473
See application file for complete search history.

(56) References Cited

U.S. PATENT DOCUMENTS

| 4,520,501 | A | * | 5/1985 | DuBrucq ............... 704/271 |
|---|---|---|---|---|
| 4,841,575 | A | | 6/1989 | Welsh et al. |
| 5,111,409 | A | | 5/1992 | Gasper et al. |
| 5,608,839 | A | * | 3/1997 | Chen ..................... 704/235 |
| 5,657,426 | A | | 8/1997 | Waters et al. |
| 5,689,618 | A | | 11/1997 | Gasper et al. |
| 5,878,396 | A | | 3/1999 | Henton |
| 5,880,788 | A | | 3/1999 | Bregler |
| 5,884,267 | A | | 3/1999 | Goldenthal et al. |
| 5,933,151 | A | * | 8/1999 | Jayant et al. ............ 345/473 |
| 5,995,119 | A | | 11/1999 | Cosatto et al. |
| 6,122,616 | A | | 9/2000 | Henton |
| 6,208,356 | B1 | | 3/2001 | Breen et al. |
| 6,232,965 | B1 | | 5/2001 | Scott et al. |
| 6,250,928 | B1 | | 6/2001 | Poggio et al. |
| 6,449,595 | B1 | * | 9/2002 | Arslan et al. ............ 704/235 |
| 6,539,354 | B1 | * | 3/2003 | Sutton et al. ............ 704/260 |
| 6,570,555 | B1 | * | 5/2003 | Prevost et al. ............ 345/156 |

\* cited by examiner

*Primary Examiner*—Daniel Abebe

(57) ABSTRACT

A method for generating animated sequences of talking heads in text-to-speech applications wherein a processor samples a plurality of frames comprising image samples. The processor reads first data comprising one or more parameters associated with noise-producing orifice images of sequences of at least three concatenated phonemes which correspond to an input stimulus. The processor reads, based on the first data, second data comprising images of a noise-producing entity. The processor generates an animated sequence of the noise-producing entity.

17 Claims, 3 Drawing Sheets

COARTICULATION METHOD FOR AUDIO-VISUAL TEXT-TO-SPEECH SYNTHESIS

RELATED APPLICATIONS

The present applications is a continuation of U.S. patent application Ser. No. 10/676,630, filed Oct. 1, 2003, which is a continuation of U.S. patent application Ser. No. 09/390,704, filed Sep. 7, 1999, which claims priority to U.S. Pat. No. 6,122,177, filed Nov. 7, 1997, the contents of which are incorporated herein by reference.

BACKGROUND OF THE INVENTION

1. Field of the Invention

The present invention relates to the field of photo-realistic imaging. More particularly, the invention relates to a method for generating talking heads in a text-to-speech synthesis application which provides for realistic-looking coarticulation effects.

2. Introduction

Visual TTS, the integration of a "talking head" into a text-to-speech ("TTS") synthesis system, can be used for a variety of applications. Such applications include, for example, model-based image compression for video telephony, presentations, avatars in virtual meeting rooms, intelligent computer-user interfaces such as E-mail reading and games, and many other operations. An example of an intelligent user interface is an E-mail tool on a personal computer which uses a talking head to express transmitted E-mail messages. The sender of the E-mail message could annotate the E-mail message by including emotional cues with or without text. Thus, a boss wishing to send a congratulatory E-mail message to a productive employer can transmit the message in the form of a happy face. Different emotions such as anger, sadness, or disappointment can also be emulated.

To achieve the desired effect, the animated head must be believable. That is, it must look real to the observer. Both the photographic aspect of the face (natural skin appearance, realistic shapes, absence of rendering artifacts) and the life-like quality of the animation (realistic head and lip movements in synchrony with sound) must be perfect, because humans are extremely sensitive to the appearance and movement of a face.

Effective visual TTS can grab the attention of the observer, providing a personal user experience and a sense of realism to which the user can relate. Visual TTS using photorealistic talking heads, the subject of the present invention, has numerous benefits, including increased intelligibility over other methods such as cartoon animation, increased quality of the voice portion of the TTS system, and a more personal user interface.

Various approaches exist for realizing audio-visual TTS synthesis algorithms. Simple animation or cartoons are sometimes used. Generally, the more meticulously detailed the animation, the greater its impact on the observer. Nevertheless, because of their artificial look, cartoons have a limited effect. Another approach for realizing TTS methods involves the use of video recordings of a talking person. These recordings are integrated into a computer program. The video approach looks more realistic than the use of cartoons. However, the utility of the video approach is limited to situations where all of the spoken text is known in advance and where sufficient storage space exists in memory for the video clips. These situations simply do not exist in the context of the more commonly employed TTS applications.

Three dimensional modeling can also be used for many TTS applications. These models provide considerable flexibility because they can be altered in any number of ways to accommodate the expression of different speech and emotions. Unfortunately, these models are usually not suitable for automatic realization by a computer. The complexities of three-dimensional modeling are ever-increasing as present models are continually enhanced to accommodate a greater degree of realism. Over the last twenty years, the number of polygons in state-of-the-art three-dimensional synthesized scenes has grown exponentially. Escalated memory requirements and increased computer processing times are unavoidable consequences of these enhancements. To make matters worse, synthetic scenes generated from the most modern three-dimensional modeling techniques often still have an artificial look.

With a view toward decreasing memory requirements and computation times while preserving realistic images in TTS methodologies, practitioners have implemented various sample-based photorealistic techniques. These approaches generally involve storing whole frames containing pictures of the subject, which are recalled in the necessary sequence to form the synthesis. While this technique is simple and fast, it is too limited in versatility. That is, where the method relies on a limited number of stored frames to maintain compatibility with the finite memory capability of the computer being used, this approach cannot accommodate sufficient variations in head and facial characteristics to promote a believable photorealistic subject. The number of possible frames for this sample-based technique is consequently too limited to achieve a highly realistic appearance for most conventional computer applications.

FIG. 1 is a chart illustrating the various approaches used in TTS synthesis methodologies. The chart shows the tradeoff between realism and flexibility as a function of different approaches. The perfect model (block 130) would have complete flexibility because it could accommodate any speech or emotional cues whether or not known in advance. Likewise, the perfect model would look completely realistic, just like a movie screen. Not surprisingly, there are no perfect models.

As can be seen, cartoons (block 100) demonstrate the least amount of flexibility, since the cartoon frames are all predetermined, and as such, the speech to be tracked must be known in advance. Cartoons are also the most artificial, and hence the least realistic-looking. Movies (block 110) or video sequences provide for a high degree of realism. However, like cartoons, movies have little flexibility since their frames depend upon a predetermined knowledge of the text to be spoken. The use of three-dimensional modeling (block 120) is highly flexible, since it is fully synthetic and can accommodate any facial appearance and can be shown from any perspective (unlike models which rely on two dimensions). However, because of its synthetic nature, three-dimensional modeling still looks artificial and consequently scores lower on the realism axis.

Sample-based techniques (block 140) represent the optimal tradeoff, with a substantial amount of realism and also some flexibility. These techniques look realistic because facial movements, shapes, and colors can be approximated with a high degree of accuracy and because video images of live subjects can be used to create the sample-based models. Sample based techniques are also flexible because a sufficient amount of samples can be taken to exchange head and facial parts to accommodate a wide variety of speech and emotions. By the same token, these techniques are not perfectly flexible because memory considerations and computation times must be taken into account, which places practical limits on the number of samples used (and hence the appearance of precision) in a given application.

To date, no animation technique exists for generating lifelike characters that could be automatically realized by a computer and that would be perceived by an observer as completely natural. Practitioners who have nevertheless sought to approximate such techniques have met with some success. Where practitioners employ a limited range of views and actions in a sample-based TTS synthesis (thereby minimizing memory requirements and computation times), photorealistic synthesis is coming within reach of today's technology. For example, the practitioner may implement a method which relies on frontal views of the head and shoulders, with limited head movements of 30 degree rotations and modest translations. While such a method has a limited versatility, often applications exist which do not require greater capability (e.g., photorealistic synthesis methods can be a viable alternative for such applications.

Sample-based methods for generating photo-realistic characters are described in currently-pending patent applications entitled "Multi-Modal System For Locating Objects In Images", Graf et al. U.S. patent application Ser. No. 08/752,109, filed Nov. 20, 1996, and "Method For Generating Photorealistic Animated Characters", Graf et al. U.S. patent application Ser. No. 08/869,531, filed Jun. 6, 1997, each of which is hereby incorporated by reference as if fully set forth herein. These applications describe methods involving the capturing of samples which are decomposed into a hierarchy of shapes, each shape representing a part of the image. The shapes are then overlaid in an designated manner to form the whole image.

For a TTS application, samples of sound, movements and images are captured while the subject is speaking naturally. These samples are processed and stored in a library. Image samples are later recalled in synchrony with the sound and concatenated together to form the animation.

One of the most difficult problems involved in producing an animated talking head for a TTS application is generating sequences of mouth shapes that are smooth and that appear to truly articulates a spoken phoneme in synchrony with the sound with which it is associated. This problem derives largely from the effects of coarticulation. Coarticulation means that mouth shapes depend not only on the phoneme to be spoken, but also on the context in which the phoneme appears. More specifically, the mouth shape depends on the phonemes spoken before, and sometimes alter, the phoneme to be spoken. Coarticulation effects give rise to the necessity to use different mouth shapes for the same phoneme, depending upon the context in which the phoneme is spoken.

Thus, the following needs exist in the art with respect to TTS technology: (1) the need for a sample-based methodology for generating talking heads to form an animated sequence which looks natural and which requires a minimal amount of memory and processing time, and thus can be automatically realized on a computer; (2) the need for such a methodology which has great flexibility in accommodating a multitude of facial appearances, mouth shapes, and emotions; and (3) the need for such a methodology which takes into account coarticulation effects.

Accordingly, an object of the invention is to provide a technique for generating lifelike, natural characters for a text-to-speech application that can be implemented automatically by a computer, including a personal computer.

Another object of the invention is to disclose a method for generating photo-realistic characters for a text-to-speech application that provides for smooth coarticulation effects in a practical and efficient model which can be used in a conventional TTS environment.

Another object of the invention is to provide a sample-based method for generating talking heads in TTS applications which is flexible, produces realistic images, and has reasonable memory requirements.

SUMMARY OF THE INVENTION

These and other objects of the invention are accomplished in accordance with the principles of the invention by providing a sample-based method for synthesizing talking heads in TTS applications which factors coarticulation effects into account. The method uses an animation library for storing parameters representing sample-based images which can be combined and/or overlaid to form a sequence of frames, and a coarticulation library for storing mouth parameters, phoneme transcripts, and timing information corresponding to phoneme sequences.

For sample-based synthesis, samples of sound, movements and images are captured while the subject is speaking naturally. The samples capture the characteristics of a talking person, such as the sound he or she produces when speaking a particular phoneme, the shape his or her mouth forms, and the manner in which he or she articulates transitions between phonemes. The image samples are processed and stored in a compact animation library.

In a preferred embodiment, image samples are processed by decomposing them into a hierarchy of segments, each segment representing a part of the image. The segments are called from the library as they are needed, and integrated into a whole image by an overlaying process.

A coarticulation library is also maintained. Small sequence of phonemes are recorded including image samples, acoustic samples and timing information. From these samples, information is derived such as rules or equations which are used to characterize the mouth shapes. In one embodiment, specific mouth parameters are measured from the image samples comprising the phoneme sequence. These mouth parameter sets, which correspond to different phoneme sequences, are stored into the coarticulation library. Based on the mouth parameters, the animation sequences are synthesized in synchrony with the associated sound by concatenating corresponding image samples from the animation library. Alternatively, rules or equations derived from the phoneme sequence samples are stored in the coarticulation library and used to emulate the necessary mouth shapes for the animated synthesis.

From the above method of creating a sample-based TTS technique which takes into account coarticulation effects, numerous embodiments and variations may be contemplated. These embodiments and variations remain within the spirit and scope of the invention. Still further features of the invention and various advantages will be more apparent from the accompanying drawings and the following detailed description of the preferred embodiments.

BRIEF DESCRIPTION OF THE DRAWINGS

FIG. 3, shows a flowchart describing a sample-based method for generating photorealistic talking heads in accordance with a preferred embodiment of the invention.

DETAILED DESCRIPTION OF THE INVENTION

Figure 1:
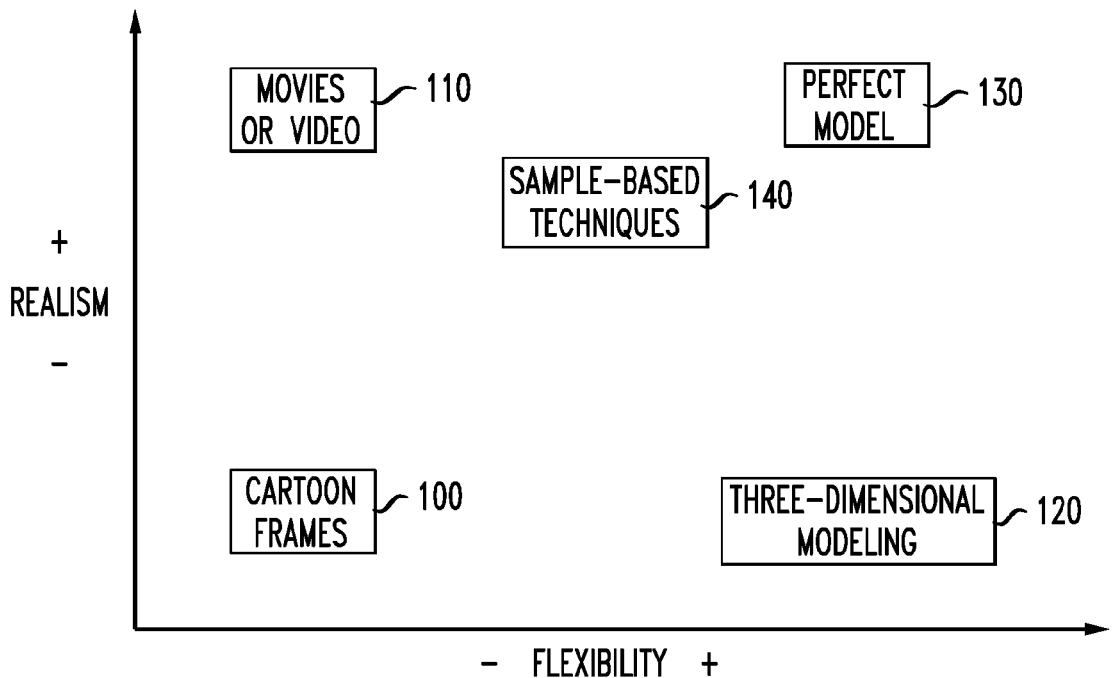
FIG. 1 represents a graph showing the relationship between various TTS synthesis techniques.
Figure 2:
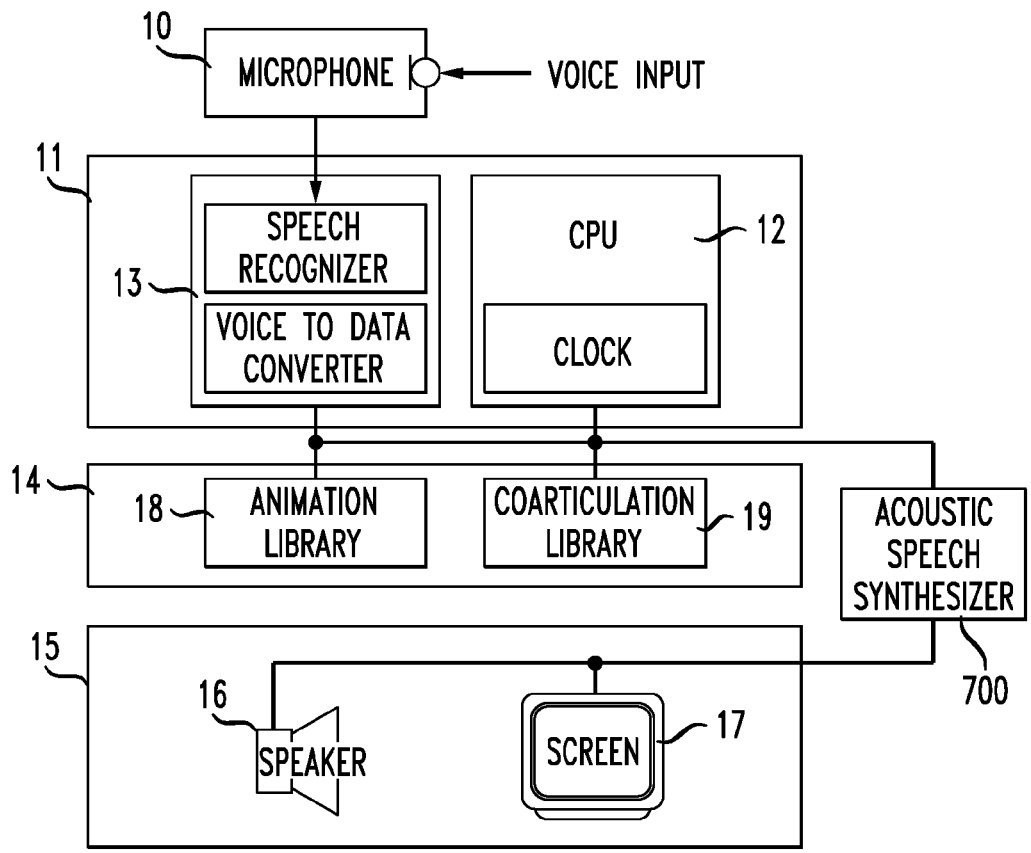
FIG. 2 shows a conceptual diagram of a system in which a preferred embodiment of the method according to the invention can be implemented.

FIG. 2 shows a conceptual diagram describing exemplary physical structures in which the method according to the invention can be implemented. This illustration describes the realization of the method using elements contained in a personal computer; in practice, the method can be implemented by a variety of means in both hardware and software, and by a wide variety of controllers and processors. A voice is input stimulus into a microphone 10. The voice provides the input which will ultimately be tracked by the talking head. The system is designed to create a picture of a talking head on the computer screen 17 of output element 15, with a voice output corresponding to the voice input and synchronous with the talking head. It is to be appreciated that a variety of input stimuli, including text input in virtually any form, may be contemplated depending on the specific application. For example, the text input stimulus may instead be a stream of binary data. The microphone 10 is connected to speech recognizer 13. I this example, speech recognizer 13 also functions as a voice to data converter which transduces the input voice into binary data for further processing. Speech recognizer 13 is also used when the samples of the subject are initially taken (see below).

The central processing unit ("CPU") 12 performs the necessary processing steps for the algorithm. CPU 12 considers the text data output from speech recognizer 13, recalls the appropriate samples from the libraries in memory 14, concatenates the recalled samples, and causes the resulting animated sequence to be output to the computer screen (shown in output element 15). CPU 12 also has a clock which is used to timestamp voice and image samples to maintain synchronization. Timestamping is necessary because the processor must have the capability to determine which images correspond to which sounds spoken by the synthesized head. Two libraries, the animation library 18 and the coarticulation library 19 (explained below), are shown in memory 14. The data in one library may be used to extract samples from the other. For instance, according to the invention, CPU 12 relies on data extracted from the coarticulation library 19 to select appropriate frame parameters from the animation library 18 to be output to the screen 17. Memory 14 also contains the animation-synthesis software executed by CPU 12.

The audio which tracks the input stimulus is generated in this example by acoustic speech synthesizer 700, which coverts the audio signal from voice-to-data converter 13 into voice. Output element 15 includes a speaker 16 which outputs the voice in synchrony with the concatenated images of the talking head.

Figure 3A:
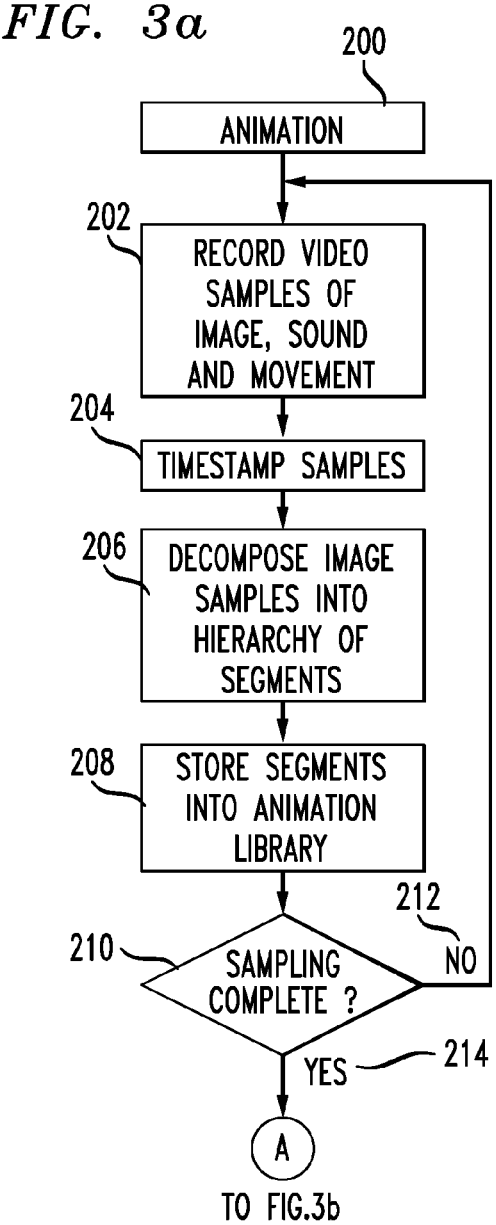
FIGS. 3a and 3b, collectively
Figure 3A:
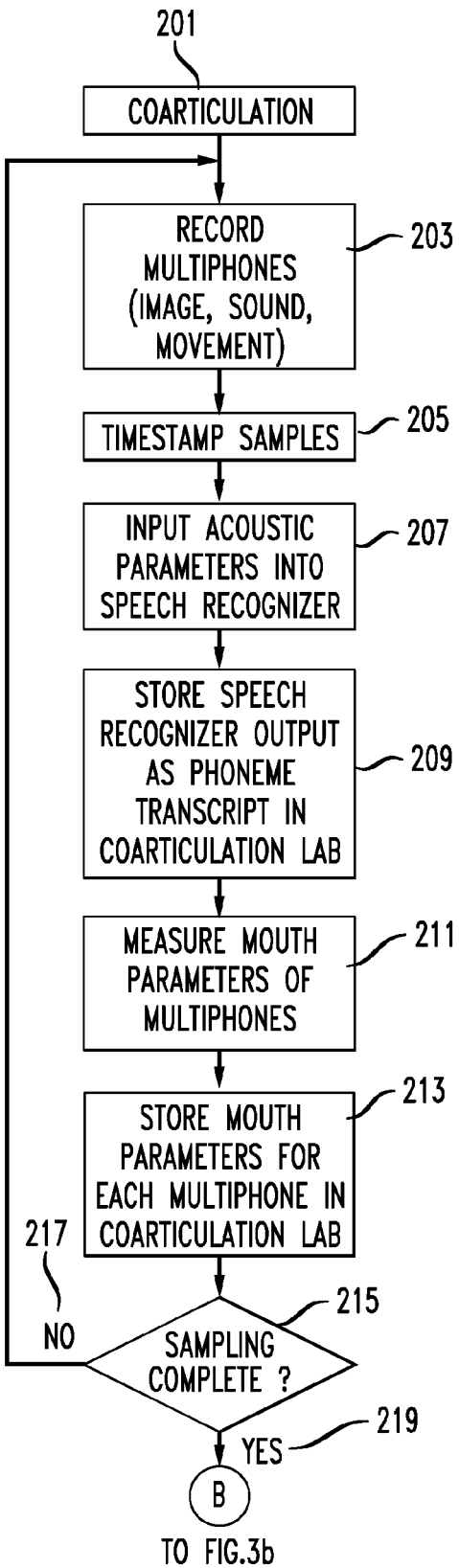
Figure 3B:
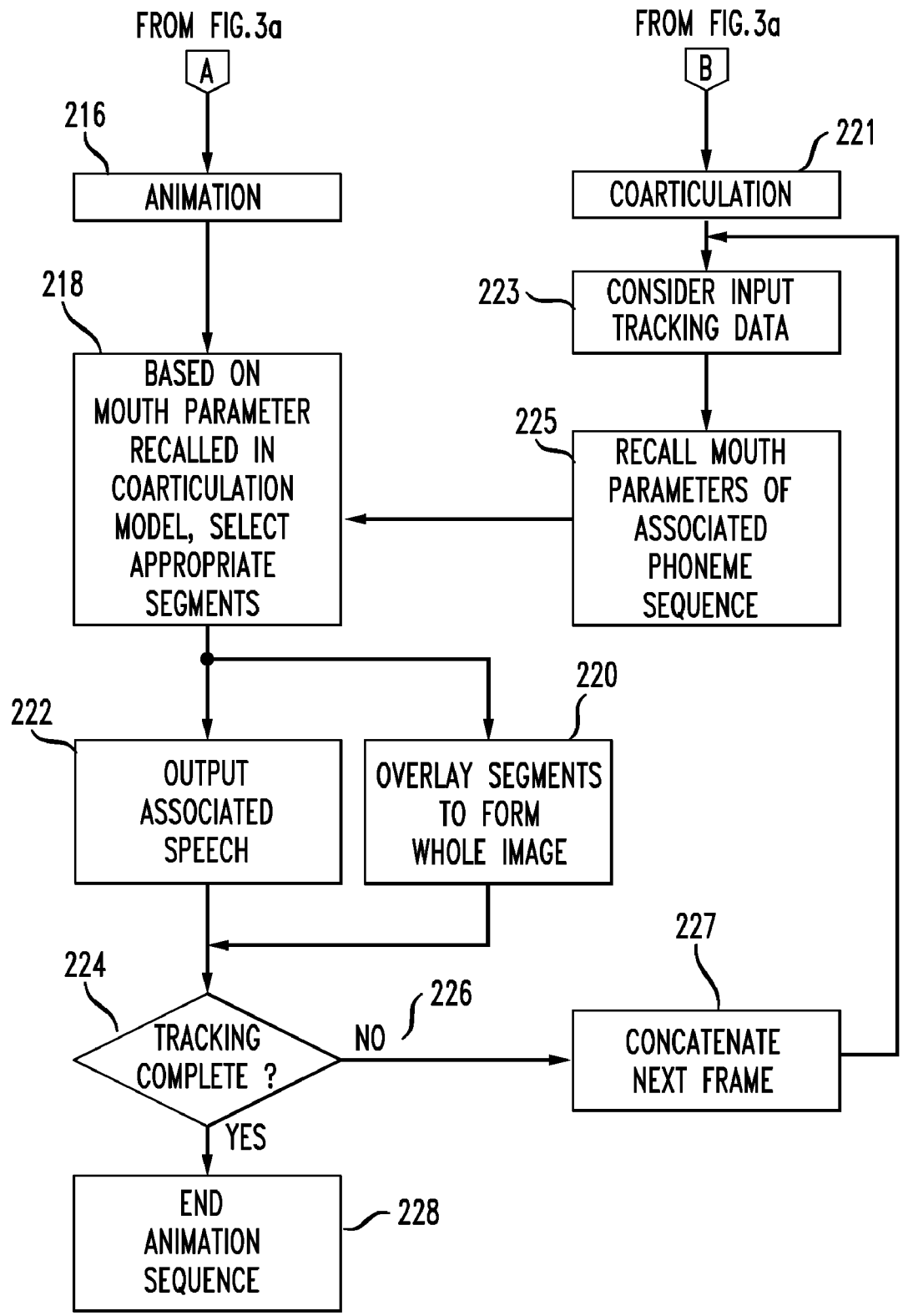

FIGS. 3a and 3b show a flowchart describing a sample-based method for synthesizing photorealistic talking heads in accordance with a preferred embodiment of the invention. For clarity, the method is segregated into two discrete processes. The first process, shown by the flowchart in FIG. 3a, represents the initial capturing of samples of the subject to generate the libraries for the analysis. The second process, shown by the flowchart in FIG. 3b, represents the actual synthesis of the photorealistic talking head based on the presence of an input stimulus.

We refer first to FIG. 3a, which shows two discrete process sections, an animation path (200) and a coarticulation path (201). The two process sections are not necessarily intended to show that they are performed by different processors or at different times. Rather, the segregated process sections are intended to demonstrate that sampling is performed for two distinct purposes. Specifically, the two process sections are intended to demonstrate the dual-purpose of the initial sampling process; i.e., to generate an animation library and a coarticulation library. Referring first to the animation path (200), the method begins with the processor recording a sample of a human subject (step 202). The recording step (202), or the sampling step, can be performed in a variety of ways, such as with video recording, computer generation, etc. In this example, the sample is captured in video and the data is transferred to a computer in binary. The sample may comprise an image sample (i.e., picture of the subject), an associated sound sample, and a movement sample. It should be noted that a sound sample is not necessarily required for all image samples captured. For example, when generating a spectrum of mouth shape samples for storage in the animation library, associated sound samples are not necessary in some embodiments.

The processor timestamps the sample (step 204). That is, the processor associates a time with each sound and image sample. Timestamping is important for the processor to know which image is associated with which sound so that later, the processor can synchronize the concatenated sounds with the correct images of the talking head. Next, in step 206 the processor decomposes the image sample into a hierarchy of segments, each segment representing a part of the sample (such as a facial part). Decomposition of the image sample is advantageous because it substantially reduces the memory requirements of the algorithm when the animation sequence (FIG. 3b) is implemented. Decomposition is discussed in greater detail in "Method For Generating Photo-Realistic Animated Characters", Graf et al. U.S. patent application Ser. No. 08/869,531, filed Jun. 6, 1997.

Referring again to FIG. 3a, the decomposed segments are stored in an animation library (step 208). These segments will ultimately be used to construct the talking head for the animation sequence. The processor then samples the next image of the subject at a slightly different facial position such as a varied mouth shape (steps 210, 212 and 202), timestamps and decomposes this sample (steps 204 and 206), then stores it in the animation library (step 208). This process continues until a representative spectrum of segments is obtained and a sufficient number of mouth shapes is generated to make the animated synthesis possible. The animation library is now generated, and the sampling process for the animation path is complete (steps 210 and 214).

To create an effective animation library for the talking head, a sufficient spectrum of mouth shapes must be sampled to correspond to the different phonemes, or sounds, which might be expressed in the synthesis. The number of different shapes of a mouth is actually quite small, due to physical limitations on the deformations of the lips and the motion of the jaw. Most researchers distinguish less than 20 different mouth shapes (visemes). These are the shapes associated with the articulation of specific phonemes which represent the minimum set of shapes that need to be synthesized correctly. The number of these shapes increases considerably when emotional cues (e.g., happiness, anger) are taken into account. Indeed, an almost infinite number of appearances result if variations in head rotation and tilt, and illumination differences are considered.

Fortunately, for the synthesis of a talking head, such subtle variations need not be precisely emulated. Shadows and tilt or rotation of a head can instead be added as a post-processing step (not shown) after the synthesis of the mouth shape.

The mouth shapes are parameterized in order to classify each shape uniquely in the animation library. Many different methods can be used to parameterize the mouth shapes. Preferably, the parameterization does not purport to capture all of the variations of the human mouth area. Instead, the mouth shapes are described with as few parameters as possible. Minimizing parameterization is advantageous because a low dimensional parameter space provides a framework for generating an exhaustive set of mouth shapes. In other words, all possible mouth shapes can be generated in advance (as in FIG. 3a) and stored in the animation library. One set of parameters used to describe the mouth shape will vary by a small amount from another set in the animation library, until a smooth spectrum of slightly varying mouth shapes is achieved. Typical parameters taken to measure mouth shapes are lip shape (protrusion) and degree of lip opening. With these two parameters, a two dimensional space of mouth shapes may be formed whereby a horizontal axis represents lip protrusion, and a vertical axis represents the opening of the mouth. The resulting set of stored mouth shapes can be used as part of the head to speak the different phonemes in the actual animated sequence. Of course, the mouth shapes may also be stored using different or additional parameters.

Depending on the application, a two-dimensional parameterization may be too limited to cover all transitions of the mouth shape smoothly. As such, a three or four dimensional parameterization may be taken into account. This means that one or two additional parameters will be measured from the mouth shape samples and stored in the library. The use of additional parameters results in a more refined and detailed spectrum of available mouth shape variations to be used in the synthesis. The cost of using additional parameters is the requirement of greater memory space. Nevertheless, the use of additional parameters to describe the mouth features may be necessary in some applications to stitch these mouth parts seamlessly together into a synthesized face in the ultimate sequence.

One solution to providing for a greater variation of mouth shapes while minimizing memory storage requirements is to use warping or morphing techniques. That is, the parameterization of the mouth parts can be kept quite low, and the mouth parts existing in the animation library can be warped or morphed to create new intermediate mouth shapes. For example, where the ultimate animated synthesis requires a high degree of resolution of changes to the mouth to appear realistic, an existing mouth shape in memory can be warped to generate the next, slightly different mouth shape for the sequence. For image warping, control points are defined using the existing mouth parameters for the sample image.

Alternatively, the mouth spaces may be sampled by recording a set of sample images that maps the space of one mouth parameter only, and image warping or morphing may be used to create new sample images necessary to map the space of the remaining parameters.

Another sampling method is to first extract all sample images from a video sequence of a person talking naturally. Then, using automatic face/facial features location, these samples are registered so that they are normalized. The normalized samples are labeled with their respective measured parameters. Then, to reduce the total number of samples, vector quantization may be used with respect to the parameters associated with each sample.

It should be noted that where the sample images are derived from photographs, the resulting face is very realistic. However, caution should be exercised when synthesizing these photographs to align and scale each image precisely. If the scale of the mouth and its position is not the same in each frame, a jerky and unnatural motion will result in the animation.

The coarticulation prong (201) of FIG. 3a denotes a sampling procedure which is performed in addition to the animation prong (200). The purpose of the coarticulation prong (201) is to accommodate effects of coarticulation in the ultimate synthesized output. The principle of coarticulation recognizes that the mouth shape corresponding to a phoneme depends not only on the spoken phoneme itself, but on the phonemes spoken before (and sometimes after) the instant phoneme. An animation method which does not account for coarticulation effects would be perceived as artificial to an observer because mouth shapes may be used in conjunction with a phoneme spoken in a context inconsistent with the use of those shapes.

The coarticulation approach according to the invention is to sample or record small sequences of phonemes, measure the mouth parameters from the images constituting the sequences, and store the parameters in a coarticulation library. For example, diphones can be recorded. Diphones have previously been used as basic acoustic units in concatenative speech synthesis. A diphone can be defined as a speech segment commencing at the midpoint (in time) of one phoneme and ending at the midpoint of the following phoneme. Consequently, an acoustic diphone encompasses the transition from one sound to the next. For example, an acoustic diphone covers the transition from an "l" to an "a" in the word "land."

Referring again to prong 201 of FIG. 3a, the processor captures a sample of a multiphone (step 203), which is typically the image, movement, and associated sound of the subject speaking a designated phoneme sequence. As in the animation prong (200), this sampling process may be performed by a video or other means. After the multiphone sample is recorded, it is timestamped by the processor so that the processor will recognize which sounds are associated with which images when it later performs the TTS synthesis. A sound is "associated" with an image (or with data characterizing an image) where the same sound was uttered by the subject at the time that image was sampled. Thus, at this point, the processor has recorded image, movement, and associated acoustic information with respect to a particular phoneme sequence. The image information for a phoneme sequence constitutes a plurality of frames.

Next, the acoustic information is fed into a speech recognizer (step 204), which outputs the acoustic information as electronic information (e.g., binary) recognizable by the processor. This information acts as a phoneme transcript. The transcript information is then stored in a coarticulation library (step 209). A coarticulation library is simply an area in memory which stores parameters of multiphone information. This library is to be distinguished from the animation library, the latter being a location in memory which stores parameters of samples to be used for the animated sequence. In some embodiments, both libraries may be stored in the same memory or may overlap. The phoneme transcript information qualifies as multiphone information; thus, it preferably gets stored in the coarticulation library.

In addition to storing the phoneme transcript information, the processor measures, extracts, and stores into the coarticulation library rules, equations, or other parameters which are derived from the phoneme sequence samples, and which are used to characterize the variations in the mouth shapes obtained from the phoneme sequence samples. For example, the processor may derive a rule or equation which characterizes the manner of movement of the mouth obtained from the recorded phoneme sequence samples. The point is that the processor uses samples of phoneme sequence to formulate these rules, equations, or other information which enables the processor to characterize the sampled mouth shapes. This method is to be contrasted with existing methods which rely on models, rather than actual samples, to derive information about the various mouth shapes.

Different types of rules, equations, or other parameters may be used to characterized the mouth shapes derived from the phoneme sequence samples. In some cases, extraction of simple equations to characterize the mouth movements provides for optimal efficiency. In one embodiment, specific mouth parameters (e.g., data points representing degree of lip protrusion, etc.) representing each multiphone sample image (step 211) are extracted. In this way, the specific mouth parameters can be linked up by the processor with the multiphones to which they correspond. The mouth parameters described in step 211 may also comprise one or more stored rules or equations which characterize the shape and/or movement of the mouth derived from the samples.

Step 213 may generally be performed before, during, or after step 209.

The method in which the mouth shapes are stored in the coarticulation library affects memory requirements. In particular, due to the large number of possible sequences, storing all images of the mouth in the coarticulation library becomes a problem—it could easily fill a few Gigabytes. Thus, we instead analyze the image, measure the mouth shapes, and store a few parameters characterizing the shapes. The mouth parameters may be measured in a manner similar to that which was previously discussed with respect to the animation prong (200) of FIG. 3*a*. The processor next records another multiphone (steps 215 and 217, etc.), and repeats the process until the desired number of multiphones are stored in the coarticulation library and the sampling is complete (steps 215 and 219).

As an example of storing only the parameters of the mouth shape relating to a given phoneme sequence, the sequence "a u a" may give rise to 30 frame samples. Instead of storing the 30 frames in memory, the processor stores 30 lip heights, 30 lip widths, and 30 jaw positions. In this way, much less memory is required than if the processor were to store all of the details of all 30 frames. Advantageously, then, the size of the coarticulation library is kept compact.

At this point, the coarticulation library contains sets of parameters characterizing the mouth shape variations for each multiphone, together with a comprehensive phoneme transcript constituting associated acoustic information relating to each multiphone.

The number of multiphones that should be sampled and stored in the coarticulation library depends on the precision required for a given application. Diphones are effective for smoothing out the most severe coarticulation problems. The influence of coarticulation, however, can spread over a long interval which is typically longer than the duration of one phoneme (on average, the duration of a diphone is the same as the duration of a phoneme). For example, often the lips start moving half a second or more before the first sound appears from the mouth. This means that longer sequences of phonemes, such a triphones, must be considered and stored in the coarticulation library for the analysis. Recording full sets of longer sequences like triphones becomes impractical, however, because of the immense number of possible sequences. As an illustration, a complete set of quadriphones would result in approximately 50 to the fourth discrete samples, each sample constituting approximately 20 frames. Such a set would result in over one hundred million frames. Fortunately, only a small fraction of all possible quadriphones are actually used in spoken language, so that the number of quadriphones that need be sampled is considerably reduced.

In a preferred embodiment, all diphones plus the most often used triphones and quadriphones are sampled, and the associated mouth parameters are stored into the coarticulation library. Storing the mouth parameters, such as the mouth width, lip position, jaw position, and tongue visibility can be coded in a few bytes and results in a compact coarticulation library of less than 100 kilobytes. Advantageously, this coding can be performed on a personal computer.

In sum, FIG. 3*a* describes a preferred embodiment of the sampling techniques which are used to create the animation and coarticulation libraries. These libraries can then be used in generating the actual animated talking-head sequence, which is the subject of FIG. 3*b*. FIG. 3*b* shows a flowchart which also portrays, for simplicity, two separate process sections 216 and 221. The animated sequence begins in the coarticulation process section 221. Some stimulus, such as text, is input into a memory accessible by the processor (step 223). This stimulus represents the particular data that the animated sequence will track. This stimulus may be voice, text, or other types of binary or encoded information that is amenable to interpretation by the processor as a trigger to initiate and conduct an animated sequence. As an illustration, where a computer interface uses a talking head to transmit E-mail messages to a remote party, the input stimulus is the E-mail message text created by the sender. The processor will generate a talking head which tracks, or generates speech associated with, the sender's message text.

Where the input is text, the processor consults circuitry or software to associate the text with particular phonemes or phoneme sequences. Based on the identity of the current phoneme sequence, the processor consults the coarticulation library and recalls all of the mouth parameters corresponding to the current phoneme sequence (step 225). At this point, the animation process section 216 and the coarticulation process section 221 interact. In step 218, the processor selects the appropriate parameter sets from the animation library corresponding to the mouth parameters recalled from the coarticulation library in step 225 and representing the parameters corresponding to the current phoneme sequence. Where, as here, the selected parameters in the animation library represent segments of frames, the segments are overlaid onto a common interface to form a whole image (step 220), which is output to the appropriate peripheral device for the user (e.g., the computer screen). For a further discussion of overlaying segments onto a common interface, see "Robust Multi-Modal Method For Recognizing Objects", Graf et al. U.S. patent application Ser. No. 08/948,750, filed Oct. 10, 1997. Concurrent with the output of the frames, the processor uses the phoneme transcript stored in the coarticulation library to output speech which is associated with the phoneme sequence being spoken (step 222). Next, if the tracking is not complete (steps 224, 226, 227, etc.), the processor performs the same process with the next input phoneme sequence. The processor continues this process, concatenating all of these frames and associated sounds together to form the completed animated synthesis. Thus, the animated sequence comprises a series of animated frames, created from segments, which represent the concatenation of all phoneme sequences. At the conclusion (step 228), the result is a talking head which tracks the input data and whose speech appears highly realistic because it takes coarticulation effects into account.

The samples of subjects need not be limited to humans. Talking heads of animals, insects, and inanimate objects may also be tracked according to the invention.

It will be understood that the foregoing is merely illustrative of the principles of the invention, and that various modifications and variations can be made by those skilled in the art without departing from the scope and spirit of the invention. The claims appended hereto are intended to encompass all such modifications and variations.

What is claimed is:

1. A computing device for generating a noise-producing entity, comprising:
   a module configured to read first data comprising one or more parameters associated with noise-producing orifice images of sequences of at least three concatenated phonemes which correspond to an input stimulus;
   a module configured to read, based on the first data, corresponding second data comprising images of a noise-producing entity; and
   a module configured to generate, using the second data, an animated sequence of the noise-producing entity tracking the input stimulus.

2. The computing device of claim 1, further comprising:
   a module configured to read acoustic data associated with the second data;
   a module configured to convert the acoustic data into sound; and
   a module configured to output the sound synchronously with the animated sequence of the noise-producing entity.

3. The computing device of claim 1, wherein the first data comprises one or more equations characterizing noise-producing orifice shapes.

4. The computing device of claim 3, wherein the first data comprises one or more equations characterizing noise-producing orifice shapes.

5. The computing device of claim 2, wherein the module configured to convert further uses a data-to-sound converter.

6. The computing device of claim 2, wherein the first data comprises segments of sampled images of a noise-producing subject.

7. The computing device of claim 2, wherein the second data comprises parameters associated with a noise-producing orifice degree of opening.

8. The computing device of claim 6, wherein the first data comprises animation data, and the second data comprises coarticulation data.

9. The computing device of claim 6, wherein the module configured to generate further overlays the segments onto a common interface to create frames comprising the animation sequence.

10. A method of generating an animated entity, the method comprising:
    reading first data associated with noise-producing orifice images of sequences of at least three concatenated phonemes;
    reading second data comprising images associated with an animated entity; and
    generating the animated entity based on the first data and the second data.

11. The method of claim 10, wherein the first data corresponds to an input stimulus and the animated entity is generated to track the input stimulus.

12. The method of claim 10, wherein the animated entity is a noise producing entity.

13. The method of claim 10, further comprising:
    reading acoustic data associated with the sound data;
    converting the acoustic data into second; and
    outputting the sound synchronously with the generation of the animated entity.

14. A computer-readable medium storing instructions for controlling a computing device to generate an animated entity, the instructions comprising:
    reading first data associated with noise-producing orifice images of sequences of at least three concatenated phonemes;
    reading second data comprising images associated with animated entity; and
    generating the animated entity based on the first data and the second data.

15. The computer-readable medium of claims 14, wherein the first data corresponds to an input stimulus and the animated entity is generated to track the input stimulus.

16. The computer-readable medium of claim 14, wherein the animated entity is a noise producing entity.

17. The computer-readable medium of claim 14, the instructions further comprising:
    reading acoustic data associated with the second data;
    converting the acoustic data into sound; and
    outputting the sound synchronously with the generation of the animated entity.

* * * * *